(12) United States Patent
Edelson (10) Patent No.: US 8,198,746 B2
(45) Date of Patent: Jun. 12, 2012

(54) CHIMNEY TURBINE

(75) Inventor: Jonathan Sidney Edelson, Portland, OR (US)

(73) Assignee: Borealis Technical Limited (GI)

( * ) Notice: Subject to any disclaimer, the term of this patent is extended or adjusted under 35 U.S.C. 154(b) by 372 days.

(21) Appl. No.: 11/900,614

(22) Filed: Sep. 11, 2007

(65) Prior Publication Data

US 2008/0007070 A1    Jan. 10, 2008

Related U.S. Application Data

(60) Continuation-in-part of application No. 11/517,086, filed on Sep. 6, 2006, now abandoned, and a continuation-in-part of application No. 11/792,967, filed on Jun. 13, 2007, and a continuation-in-part of application No. 11/587,348, filed as application No. PCT/US2005/013748 on Apr. 22, 2005, now abandoned, which is a continuation-in-part of application No. 11/792,967, filed as application No. PCT/US2005/045409 on Dec. 13, 2005, which is a continuation-in-part of application No. 11/029,978, filed on Jan. 4, 2005, now Pat. No. 7,116,019, which is a division of application No. 10/132,936, filed on Apr. 26, 2002, now Pat. No. 6,835,791, which is a continuation-in-part of application No. 09/713,654, filed on Nov. 15, 2000, now Pat. No. 6,657,334, application No. 11/900,614, which is a continuation-in-part of application No. 11/630,293, filed as application No. PCT/US2005/022011 on Jun. 21, 2005, and a continuation-in-part of application No. 11/587,348, filed as application No. PCT/US2005/013748 on Apr. 22, 2005, now abandoned.

(60) Provisional application No. 60/843,930, filed on Sep. 11, 2006, provisional application No. 60/714,603, filed on Sep. 7, 2005, provisional application No. 60/737,587, filed on Nov. 16, 2005, provisional application No. 60/565,802, filed on Apr. 26, 2004, provisional application No. 60/635,797, filed on Dec. 13, 2004, provisional application No. 60/737,587, filed on Nov. 16, 2005, provisional application No. 60/581,789, filed on Jun. 21, 2004, provisional application No. 60/286,862, filed on Apr. 26, 2001, provisional application No. 60/565,802, filed on Apr. 26, 2004.

(51) Int. Cl.
*F03D 9/00* (2006.01)

(52) U.S. Cl. ............................................. 290/54; 290/43

(58) Field of Classification Search ................ 310/67 A; 290/43, 44, 52, 54, 55
See application file for complete search history.

(56) References Cited

U.S. PATENT DOCUMENTS

| 382,279 | A | | 5/1888 | Testa | |
|---|---|---|---|---|---|
| 3,215,966 | A | * | 11/1965 | Lord, Jr. et al. | ............... 336/211 |
| 3,453,468 | A | * | 7/1969 | Lund | ............................. 310/180 |
| 3,643,624 | A | * | 2/1972 | Eng et al. | .................. 116/137 A |
| 3,808,481 | A | | 4/1974 | Rippel | |
| 3,821,619 | A | | 6/1974 | Hoffman | |
| 3,930,190 | A | | 12/1975 | Liska | |
| 3,931,553 | A | | 1/1976 | Stich et al. | |
| 4,289,970 | A | * | 9/1981 | Deibert | ........................... 290/44 |

(Continued)

FOREIGN PATENT DOCUMENTS

DE        20/03639 A        8/1971

(Continued)

*Primary Examiner* — Dang Le (57) ABSTRACT

The present invention is a ring generator with a rotor internal diameter equal to the turbine outside diameter, and having the turbine mounted on the inside of the rotor.

15 Claims, 7 Drawing Sheets

U.S. PATENT DOCUMENTS

| | | | |
|---|---|---|---|
| 4,292,575 A | | 9/1981 | Kuhnlein et al. |
| 4,367,413 A | * | 1/1983 | Nair ............................... 290/52 |
| 4,459,087 A | * | 7/1984 | Barge ............................. 417/356 |
| 4,484,115 A | | 11/1984 | Takahashi |
| 4,607,204 A | | 8/1986 | Setoya |
| 4,611,157 A | | 9/1986 | Miller et al. |
| 4,713,594 A | | 12/1987 | Bose et al. |
| 4,730,150 A | | 3/1988 | Lee et al. |
| 4,736,147 A | | 4/1988 | Shizhang |
| 4,751,448 A | | 6/1988 | Auinger |
| 4,755,732 A | | 7/1988 | Ando |
| 4,900,965 A | | 2/1990 | Fisher |
| 5,053,689 A | | 10/1991 | Woodson et al. |
| 5,068,587 A | | 11/1991 | Nakamura et al. |
| 5,075,610 A | | 12/1991 | Harris |
| 5,211,546 A | * | 5/1993 | Isaacson et al. ............. 417/356 |
| 5,220,231 A | * | 6/1993 | Veronesi et al. .............. 310/90 |
| 5,311,092 A | * | 5/1994 | Fisher ........................... 310/266 |
| 5,449,962 A | | 9/1995 | Shichijyo et al. |
| 5,488,280 A | | 1/1996 | Langreck |
| 5,607,329 A | * | 3/1997 | Cho et al. ........................ 440/6 |
| 5,614,799 A | | 3/1997 | Anderson et al. |
| 5,686,770 A | | 11/1997 | Naito |
| 5,703,457 A | | 12/1997 | Davis |
| 5,977,679 A | * | 11/1999 | Miller et al. .................. 310/164 |
| 6,054,837 A | | 4/2000 | Edelson |
| 6,064,172 A | | 5/2000 | Kuznetsov |
| 6,101,109 A | | 8/2000 | Duba et al. |
| 6,153,953 A | * | 11/2000 | Isozaki et al. .......... 310/216.112 |
| 6,175,272 B1 | | 1/2001 | Takita |
| 6,201,313 B1 | * | 3/2001 | Nakamats ....................... 290/54 |
| 6,348,775 B1 | | 2/2002 | Edelson et al. |
| 6,351,095 B1 | | 2/2002 | Edelson |
| 6,373,160 B1 | | 4/2002 | Schrodl |
| 6,559,567 B2 | | 5/2003 | Schob |
| 6,570,361 B1 | | 5/2003 | Edelson |
| 6,605,883 B2 | * | 8/2003 | Isozaki et al. ............... 310/49.42 |
| 6,657,334 B1 | | 12/2003 | Edelson |
| 6,768,279 B1 | | 7/2004 | Skinner et al. |
| 6,812,661 B2 | | 11/2004 | Maslov |
| 6,831,430 B2 | | 12/2004 | Edelson |
| 6,836,028 B2 | * | 12/2004 | Northrup et al. ................. 290/44 |
| 6,838,791 B2 | | 1/2005 | Edelson |
| 6,892,439 B1 | | 5/2005 | Neal et al. |
| 6,922,037 B2 | | 7/2005 | Edelson |
| 7,116,019 B2 | | 10/2006 | Edelson |
| 2002/0041168 A1 | | 4/2002 | Mann et al. |

FOREIGN PATENT DOCUMENTS

| | | |
|---|---|---|
| WO | WO-00/51229 A1 | 8/2000 |
| WO | WO-2005/107036 A2 | 11/2005 |
| WO | WO-2006/002207 A2 | 1/2006 |
| WO | WO-2006/065988 A2 | 6/2006 |

* cited by examiner

CHIMNEY TURBINE

CROSS-REFERENCE TO RELATED APPLICATIONS

This application claims the benefit of Provisional Patent Application No. 60/843,930, filed Sep. 11, 2006, and is a Continuation-in-part of U.S. patent application Ser. No. 11/517,086, filed Sep. 6, 2006, now abandoned which claims the benefit of: Provisional Patent Application No. 60/714,603, filed Sep. 7, 2005; Provisional Patent Application No. 60/737,587, filed Nov. 16, 2005; and International Application No. PCT/US2005/45409, filed Dec. 13, 2005.

This application is also a Continuation-in-part of U.S. patent application Ser. No. 11/792,967, filed Jun. 13, 2007, which is the U.S. national stage application of International Application No. PCT/US2005/045409, filed Dec. 13, 2005, which international application was published on Jun. 22, 2006, as International Publication WO/2006/065988 in the English language. The International Application claims the benefit of U.S. Provisional Patent Application No. 60/635,767, filed Dec. 13, 2004, and U.S. Provisional Patent Application No. 60/737,587, filed Nov. 16, 2005.

This application is also a Continuation-is-part of U.S. patent application Ser. No. 11/630,293, filed Dec. 19, 2006, now U.S. Pat. No. 7,928,683 which is the U.S. national stage application of International Application No. PCT/US2005/022011, filed Jun. 21, 2005, which international application was published on Jan. 5, 2006, as International Publication WO2006/002207 in the English language. The International Application claims the benefit of Provisional Patent Application No. 60/581,789, filed Jun. 21, 2004 and is a Continuation-in-part of U.S. patent application Ser. No. 11/029,978, filed Jan. 4, 2005, which is a Divisional of U.S. patent application Ser. No. 10/132,936 filed Apr. 26, 2002, now U.S. Pat. No. 6,838,791 and which claims the benefit of U.S. Provisional App. No. 60/286,862 filed Apr. 26, 2001. U.S. patent application Ser. No. 10/132,936 is a Continuation-in-part of U.S. patent application Ser. No. 09/713,654, filed Nov. 15, 2000 now U.S. Pat. No. 6,657,334.

This application is also a continuation is part of U.S. patent application Ser. No. 11/587,348, now abandoned filed Oct. 24, 2006, which is the U.S. national stage application of International Application PCT/US2005/013748, filed Apr. 22, 2005, which international application was published on Nov. 10, 2005, as International Publication WO2005/107036 in the English language. The International Application claims the benefit of Provisional Patent Application No. 60/565,802, filed Apr. 26, 2004.

These documents are hereby incorporated herein by reference in their entirety.

BACKGROUND OF THE INVENTION

The present invention is concerned with ducted turbines for use in relatively hostile environments.

Use of ducted propellers for use as thrusters, waterjets etc on ships is well known. In one configuration, these are mounted on pylons with gearboxes in the hub of the pylon, and drive being supplied by an external motor via a drive shaft.

BRIEF SUMMARY OF THE INVENTION

The present invention is a rotating induction machine for use in hostile environment having high temperatures and particulate matter. In broad terms a ring induction machine stator is provided, exterior to a ring rotor. The ring rotor has an internal diameter equal to the outside diameter of the turbine. The outer tips of the turbine are attached to the inner surface of the rotor ring.

In a preferred embodiment, the invention consists of a ring generator, in which a first ring forms a toroidally wound stator and a second ring forms the rotor. A turbine is fixed to the rotor ring. The invention is specifically targeted towards hostile environments having high temperatures and high particulate matter, such as inside a chimney or stack. Therefore, to protect the rotor and stator, a protective material such as multi-layer epoxy is used. This protects the steel from corrosion and the electrical insulation from breakdown.

The rotor is expected to spin with the turbine, with or without gearing. The turbine is mounted on a central shaft with sealed bearings between it and a turbine hub. For support, the turbine hub may be connected to the stator with a series of struts mounted on both the front and back of the stator.

In a preferred embodiment, the stator has more than three different phases per pole, and preferably many more. Electronic means may be used for providing current of a variety of harmonic orders lower than the phase count, particularly to saturate the airgap and increase the flux in the region. Also, harmonics may be used to vary the machine impedance. If the stator is connected mesh, and/or if the stator is wound so that repeated phases in different poles each receive dedicated drive, for example, a separate inverter leg supplies each phase, as opposed to an inversion of one phase supplying a second phase, further options exist. For example, the voltage to the phases may be moderated to control the rotor alignment relative to the stator.

In another aspect, the present invention is a method for generating electricity in a flue gas stack, comprising the steps of: mounting the ring generator of the stack, the ring generator comprising a turbine, a rotor and a stator; allowing a rising column of flue gases in the stack to rotate the turbine; and rotating the rotor to which the turbine is affixed in relation to the stator so that electricity is generated.

DETAILED DESCRIPTION OF THE INVENTION

Figure 1:
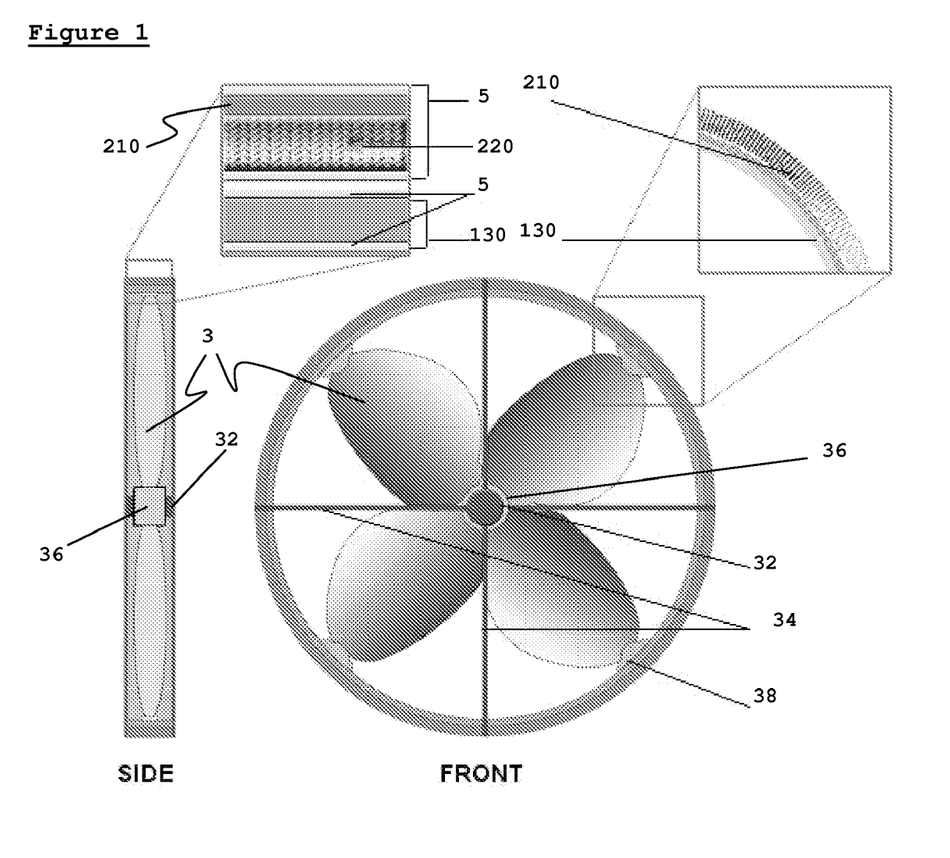
FIG. 1 shows a general design layout.

Referring now to FIG. 1, the present invention comprises an integral "ring induction generator" at the outside edge of the unit. This generator unit consists of a first and a second ring, forming the stator and the rotor. In the instant and preferred embodiment, the outer ring is stator 210, with toroidal windings wrapping around the inside and outside. The inside ring is rotor 130. The rotor laminations should be thick enough to carry all of the flux. The tips of turbine 3 are fixed to the inside surface of rotor 130, so that the rotation of turbine 3 provides direct drive to rotor 130. A benefit of the ring design is that the entire rotor circumference is involved in electrical power production.

Since flue gases permeate the space between rotor 130 and stator 210, both rotor 130 and stator 210 are individually potted in a protective material 5 to protect the steel of the stator and rotor from rust and the electrical insulation from breakdown. The gap between rotor 130 and stator 210 is quite large by electrical machine standards to provide space for protective material 5 within the gap. It is important that protective material 5 is permeable to the magnetic field generated. In a preferred embodiment, protective material 5 is multi-layer epoxy or the equivalent.

Rotor 130 spins with turbine 3, and is mounted with turbine mounts 38 on a central shaft 32 with sealed bearings (not shown). Shaft 32 is connected to the outer ring (stator 210) with a series of struts 34 mounted on both the front and back of stator 210.

In a flue stack environment a rising column of flue gases in the stack rotate the turbine, which in turn causes the rotor to which the turbine is affixed to rotate in relation to the stator and generate electricity.

In a preferred embodiment, conventional M19 steel is used for the stator, since the magnetic flux densities are limited by the extremely large air-gap. In a further embodiment, the stator teeth are formed relatively narrow and the stator slots relatively wide, since the total flux is low and therefore it is desirable to have space for additional copper stator windings over what would be commonplace for a conventional generator. In one embodiment, the stator slots are substantially wider than the stator teeth.

In a preferred embodiment, stator 210 is wound with a toroidal winding.

Figure 2A:
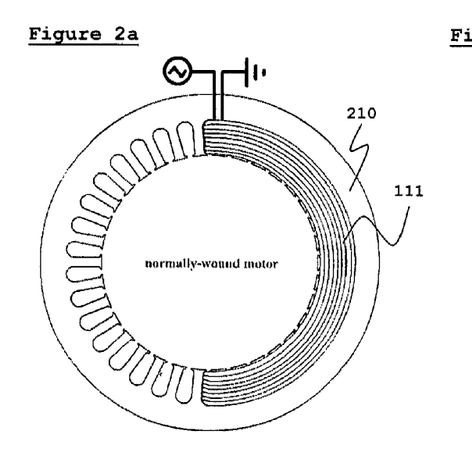
FIGS. 2A-2E shows a schematic of a toroidal winding.

With reference now to FIG. 2a, an end view of one of the windings of a prior art, normally wound, 2 pole stator is shown. The winding is composed of multiple conductor turns 111, placed in two slots on opposite sides of the stator. The conductor turns form a loop around the two sides on the stator via end turns as shown. As will be readily appreciated, these end turns comprise a more-or-less large proportion of the total conductor length used, depending on the relative length and diameter of the stator. This represents a full span winding. Short pitch winding are often used to reduce the problems with end turns, but they introduce their own costs.

Figure 2B:
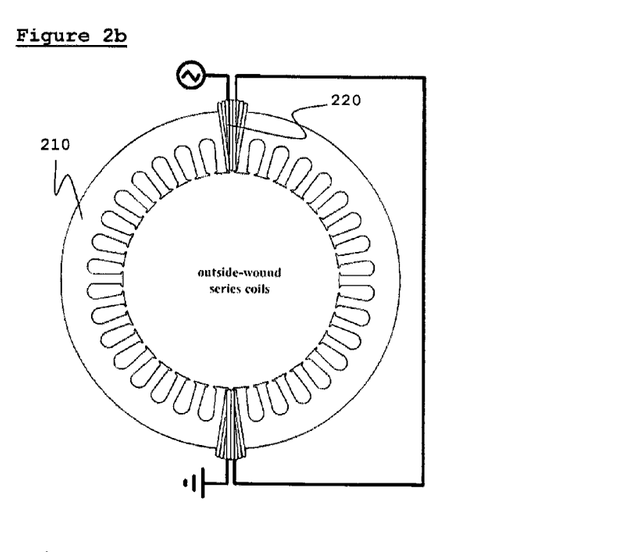

FIG. 2b shows a schematic for the toroidal winding. The toroidal winding may be described as an outside-wound stator, in which the conductor forms a loop 220, not via end turns as in the prior art, but via the outside of the stator. Assuming the stator is shaped like a hollow cylinder, each coil is wound down an internal wall of the cylinder, across the bottom cylinder wall, back up the corresponding outside wall of the cylinder, and across the top cylinder wall. The rotor is internal to the stator, and only the portion of the coil that is internal to the stator cylinder is active. A large number of coils are placed around the stator circumference. FIG. 2b is simplified to show only two coils. These are connected in series, in a two pole configuration, as is commonly employed.

Figure 2C:
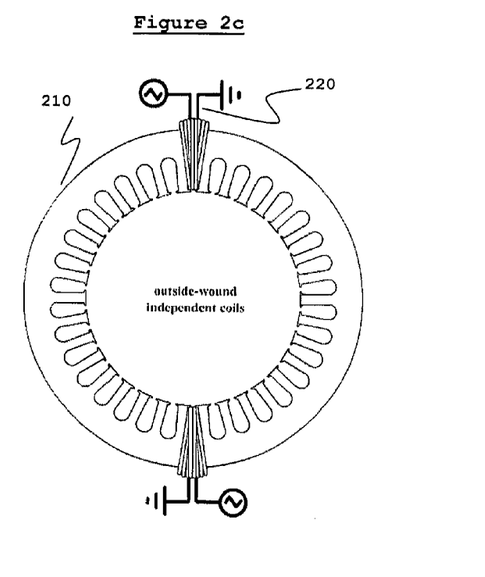

With reference now to FIG. 2c, a toroidal wrapped generator is shown, in which coils are each independently driven.

Figure 2D:
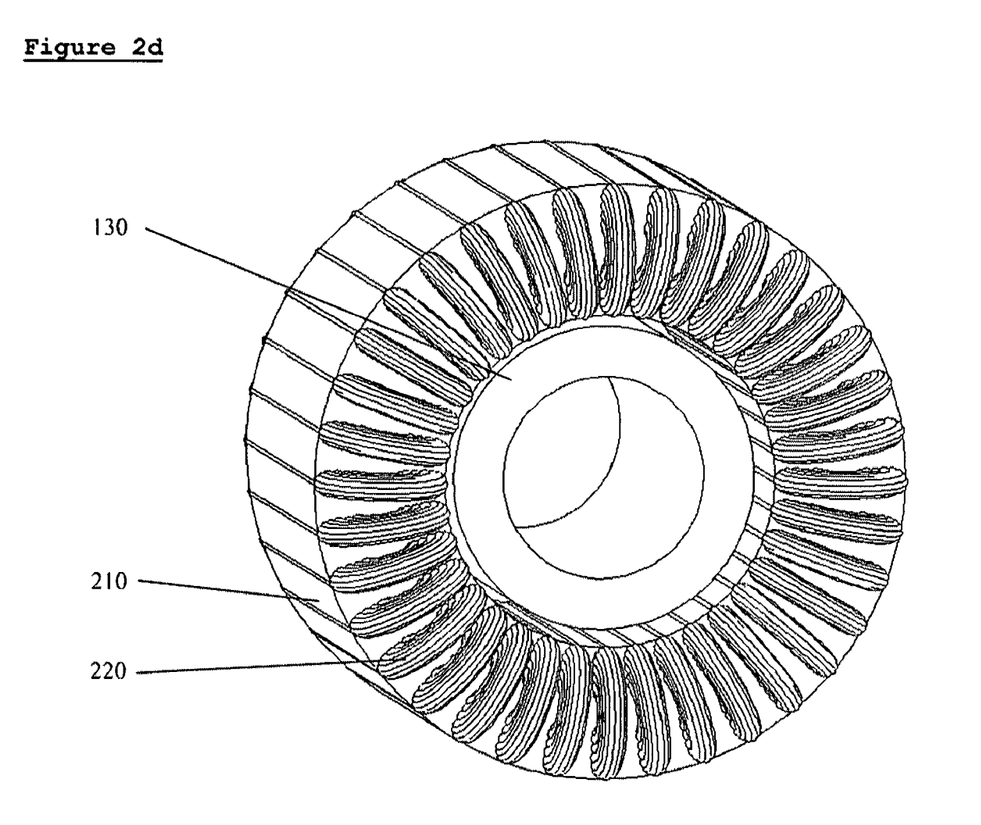

With reference now to FIG. 2d, a fully wound view of stator 210 is provided. Stator 210 is equipped with slots on the inside and out. Rotor 130 is internal to stator 210. 36 coils 220 are individually wrapped around stator 210. Wrapping the coil around the outside of the stator in this fashion provides a design that is easier to wind, can have excellent phase separation, and allows independent control of the current in each slot. This eliminates many cross stator symmetry requirements.

Figure 2E:
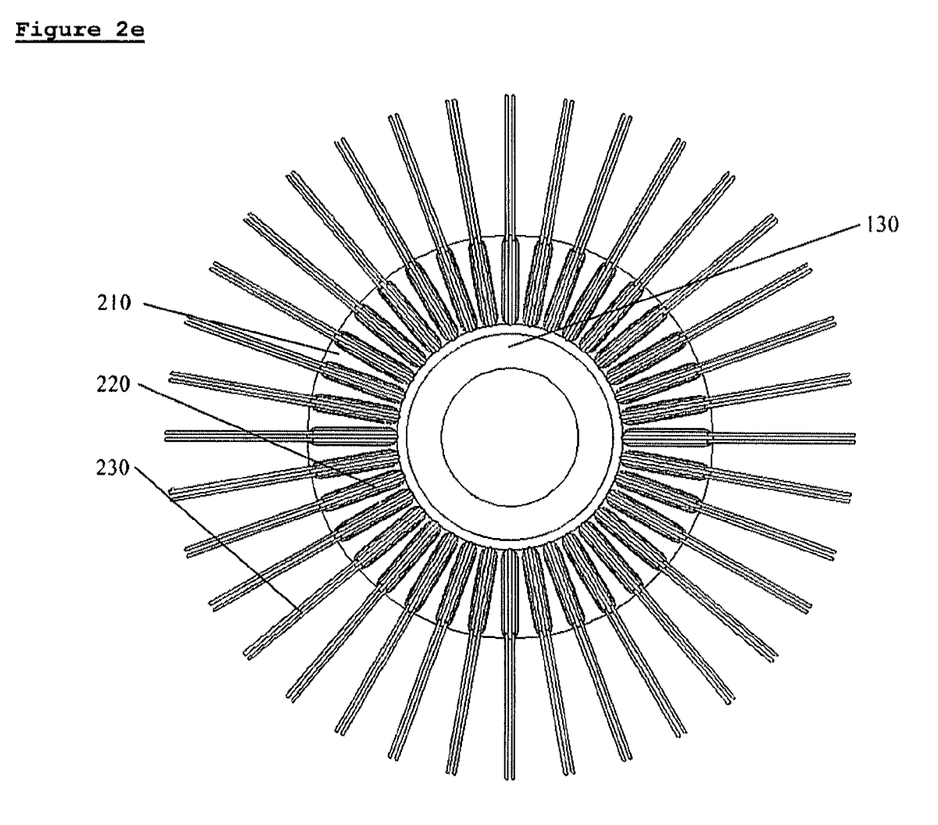

With reference now to FIG. 2e, a stator equivalent to FIG. 2d is shown, with two terminals 230 shown for each coil. Terminals 230 may be connected in series or parallel to other coils, and are driven by inverter outputs.

The present invention is a system to use the mechanical work done by a rising column of flue gases in a chimney to generate electricity.

The concept further including sensor apparatus to ensure that the flue gases are still hot enough to move to a safe level in the atmosphere when leaving the chimney.

The value of the design depends on stator length and circumference, and winding configurations. These determine how much of the conductor coils are unused in active power production. In conventional stator designs, the unused conductor is generally in the 'end turn' length. For example, in a large, conventional two pole machine, in which the end turns must each cross the stator diameter, the amount of wire wasted as end turns is easily longer than the wires actively used in the slots. For example, a 2 pole machine having a slot length of 4.5 inches and a mean turn length on the order of 40 inches, has 75% of the wire in the 'end turn', and the end turn is very bulky, requiring a shorter lamination stack. In contrast, by using the toroidal winding, the unused conductor will be shortened considerably. This is the case even though the 'back half' of each coil is not used, since in many designs the back side of the coils is considerably shorter than the 'end turns'.

It is significant to note that the relative change in unused conductor length is not caused only by the number of poles, but instead by the ratio of pole size to slot length. For example, with 'pancake' machines with short slot length, the toroidal winding will result in a shorter end turn even for machines of high pole count. In general, the following design features will be most advantageously suited to the toroidal winding of the present invention: low pole count, short slot length, long pole span (circumference), and large diameter. The particular configuration for any particular design will depend upon all of these factors.

When a conductor is wound in a stator, each turn of the conductor through a slot will have the same voltage. This is the same for lap windings and toroidal windings. However, in a toroidal winding, each turn consists of a conductor in only one slot, as opposed to a conventional winding, in which each turn consists of two slots. Therefore, for a toroidal winding, the voltage per turn is reduced by half.

Another benefit of the toroidal design is improved slot fill. Conventional machines are built using what are known as 'random wound' coils where coils of wire are inserted into the slots. Partly due to the cross-stator end turn requirement, this results in a random arrangement of adjacent conductors. In a toroidal winding, the coils are formed around the stator structure. By carefully placing the wire in an ordered fashion, a pseudo 'formed coil' is produced.

The toroidal winding is preferred since this provides a very short end turn length, and much denser packing of the wire. This is especially important since there will only be a few turns of wire per phase per pole. It is preferable to use 'flat' or rectangular wire for the stator windings. The toroidal winding is used to minimize the end turns. In any rotating machine, the important portion of the wires is actually in the slots, and there is also a substantial degree of wiring wasted in the 'end turns'. The end turns have no value magnetically, but are necessary for current to flow through the system, since current only flows in circuits. In a normal rotating machine, a coil of wire will sit in two slots, with the end turn spanning the outside between the two slots. In the toroidal wound machine, the coils of wire wrap around the inside and the outside of the stator. In a preferred embodiment, each coil is only in a single slot, so each slot will have a high number of turns of wire wrapped around the stator at that location.

The stator windings may have any number of poles. In one embodiment, the stator has a high number of poles, for example 20 or even more. It is preferable to have large magnetic poles. The reason for this is that the large non-magnetic gap between rotor and stator requires relatively large magnetizing current per pole, so by having fewer, larger poles the magnetizing current required for the gap is minimized. This needs to be balanced against the size of the 'back iron' needed to carry the flux between poles. Therefore it is preferred not to build mammoth two pole machines, but instead to provide a machine that will have a relatively low number of poles for the radius of the airgap. The low number of poles and the very short stack length versus diameter is what makes the toroidal winding particularly attractive over a conventional end turn design.

In a preferred embodiment, the stator incorporates a high number of different phases per pole. A high phase count enables harmonics to be exploited instead of wasted, since all stray harmonics of harmonic order up to the phase count are harnessed to produce useful torque in the direction and speed of rotation. A high phase count further provides greater fault tolerance in the case of a single-phase failure. A further benefit arises from using a high number of phases, in that the inverter with appropriate command electronics can be used to deliberately inject harmonics. One particular use of high order harmonics in the present invention is as follows: The preferred design of the toroidal stator is with narrow teeth and a large airgap. However, this leads to the teeth and gap area easily being magnetically saturated relative to the stator core. By injecting higher order harmonics according to the phase count, stator dimensions, and degree of saturation, it is possible to reduce airgap magnetization losses and improve efficiency. One suggested formula for this would be an f(theta) that describes the air-gap flux density.

In a normal machine, $f(theta)=sin(theta)$

From prior art, $f(theta)=sin(theta)+A*sin(3*theta+phase)$

For injecting harmonics to saturate the airgap, it is possible to use any waveform in which the peak flux density is reduced, and regions with lower flux density are enhanced, keeping the total flux density constant. The simplest waveform to use is to add appropriately phased third harmonic.

As machine dimensions increase, the number of poles and/or phases may be increased. It is preferred to include a high number of different phases per pole, for example 36 different phases per pole, or even higher.

The windings may be connected to an inverter drive with a full bridge, or with half-bridges in a star or a mesh connection. Any of the mesh connections or the star connection may be used. Since this is mainly intended as a fan-type load with substantially no low speed high torque requirement, in a preferred embodiment the windings are connected with a star connection.

In a further preferred embodiment, each of the stator winding phases, in each pole, is independently driven by a dedicated inverter leg, enabling the machine to be operated with second harmonic. Second harmonic is prohibited when a single inverter leg is used to drive repeated and inverted phases in different poles.

The stator does not need to be toroidal wound at all. It could be a conventionally wound radial flux stator, with regular end turns. The end turns would be bent to follow the curve of the stator, so as to reduce shear drag. However, this is not preferred for the following reason: The machine requires a large 'airgap', due to the need for epoxy potting, for ease of construction, and to reduce water friction. Because of the large airgap, large pole areas are needed. Large pole areas in a conventionally wound radial flux stator mean long end turn spans which would be extremely large, with far more conductor volume in the end turns than are actually provided in the slots. The machine would thus be dominated by the end turns, and would be much less efficient.

Figure 3:
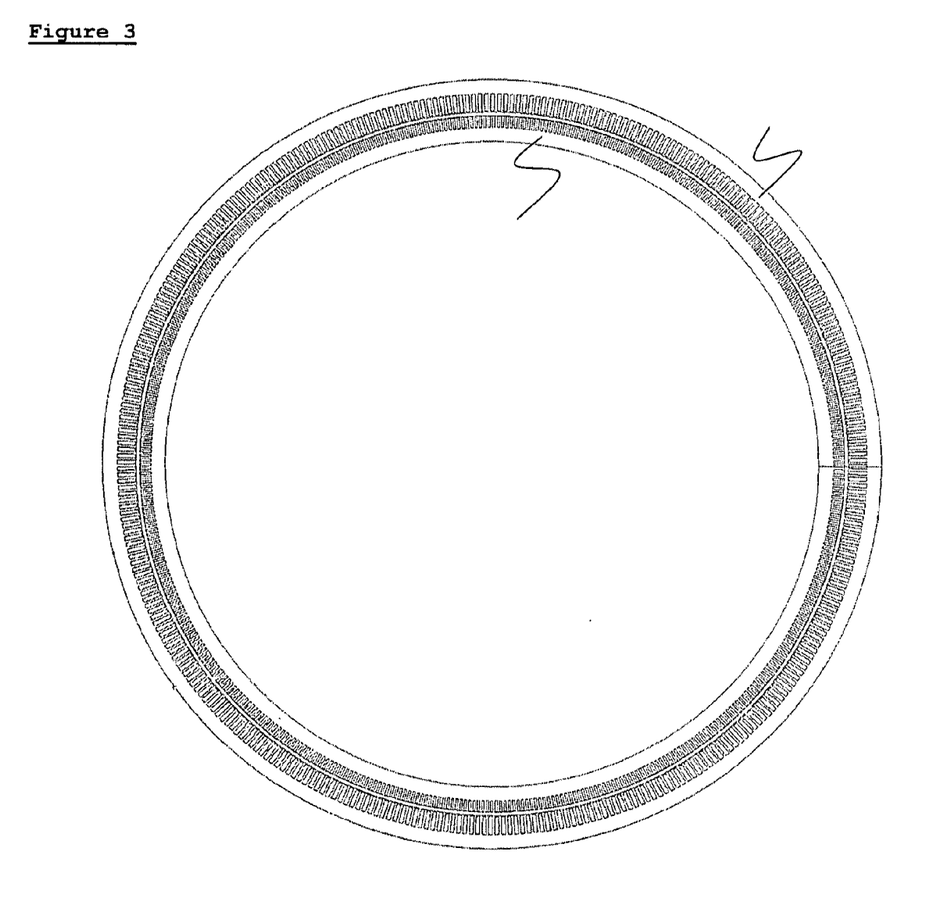
FIG. 3 shows a typical stator/rotor pair with lamination schematic.

The rotor may be of any type, in a preferred embodiment, it is a conventional copper bar squirrel cage with copper end rings. Referring now to FIG. 3, rotor 130 is shown in the form of a ring of very large diameter, and is relatively thin and short. Stator 210 is a ring of inner diameter slightly greater than the outer diameter of rotor 130. In this embodiment, the stator and rotor stack lengths are substantially shorter than their diameters. There are a large number of stator and rotor teeth, preferably one per phase per slot. It is preferred to have a relatively low number of poles and a relatively high number of different phases, for example 30 different phases per pole. This diagram is simplified and does not show the turbine, but as shown in FIG. 1, turbine 3 is attached to the inside of ring rotor 130, and is preferably welded into place. The turbine shaft 32 is supported on bearings (not shown), and the bearings are in a hub 36 supported by struts 34 going to the outside ring. The turbine hub is supported against radial forces and axial forces by struts 34, and turbine 3 is free to rotate, with tangential forces applied by the machine.

Rotor and/or stator bearings may be active or passive.

A preferred form of active bearings is as follows. If at least one phase in at least two poles is provided with dedicated drive by an independent inverter leg, the inverter drive can provide slightly variations in drive to these phases in order to actively position the rotor relative to the stator. Further details on this form of active bearings are available in WO2005/107036, incorporated herein by reference in its entirety. In practice, this form of active alignment requires a dedicated inverter leg for at least one phase in at least two poles. Alternatively, each of the phases in each of the poles can be independently driven. Alternately again, one phase of each pole that has a certain phase angle or the inverse of that that phase angle could be independently driven. Also required is a detector for measuring the alignment of the rotor with the stator. Correction of misalignment is produced by the inverter drive capacity to produce slight variability in drive voltage/stator current pattern to one or more of the phases, so that the rotor is pulled to one side or the other.

The present invention may utilize any control techniques normally used for induction machine control, including but not limited to V/Hz control, field oriented control, vector control, sensor-less vector control, etc.

Figure 4A:
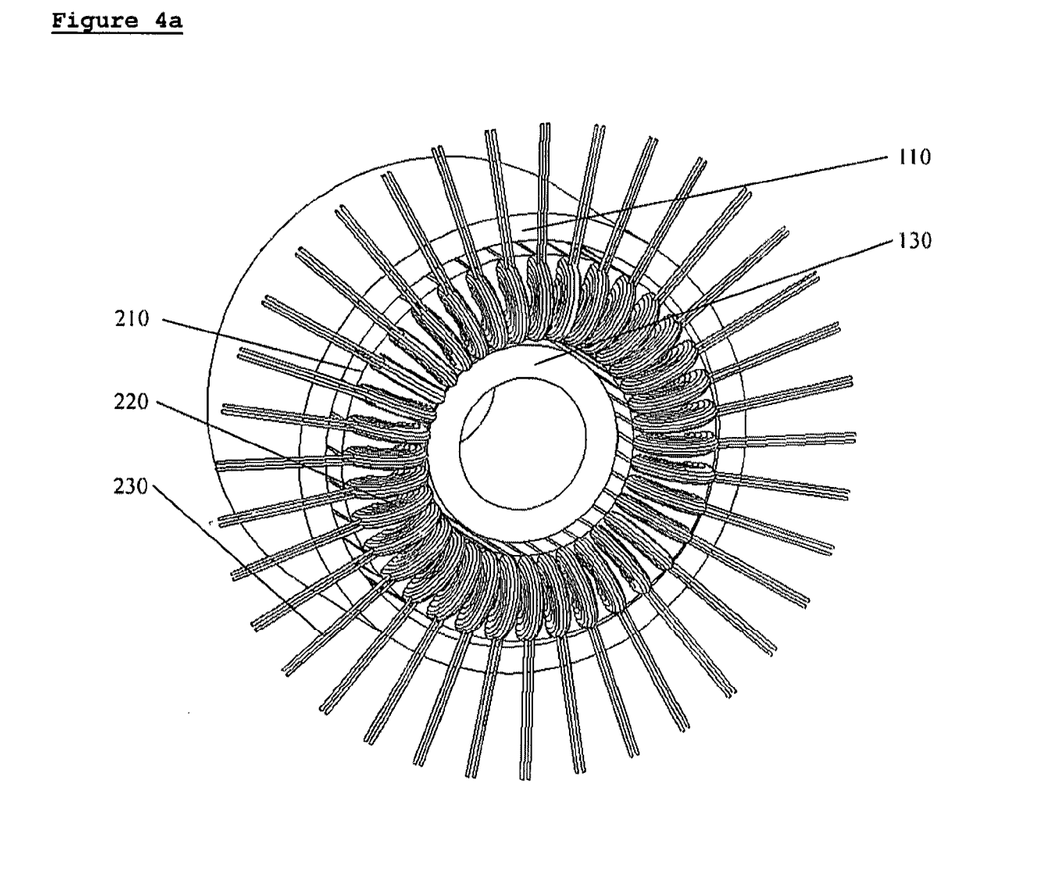
FIGS. 4A-4B shows a dual rotor embodiment.

With reference now to FIG. 4a, in a further embodiment, a dual rotor is used. One rotor part is internal to and one external to the stator. Stator 210 has teeth on the inside and outside. Conducting windings 220 are wound around stator 210. External rotor 110 is external to stator 210. Internal rotor 130 is internal to stator 210. The benefit of the dual rotor is that more of the stator winding conductors are involved in active power production.

Figure 4B:
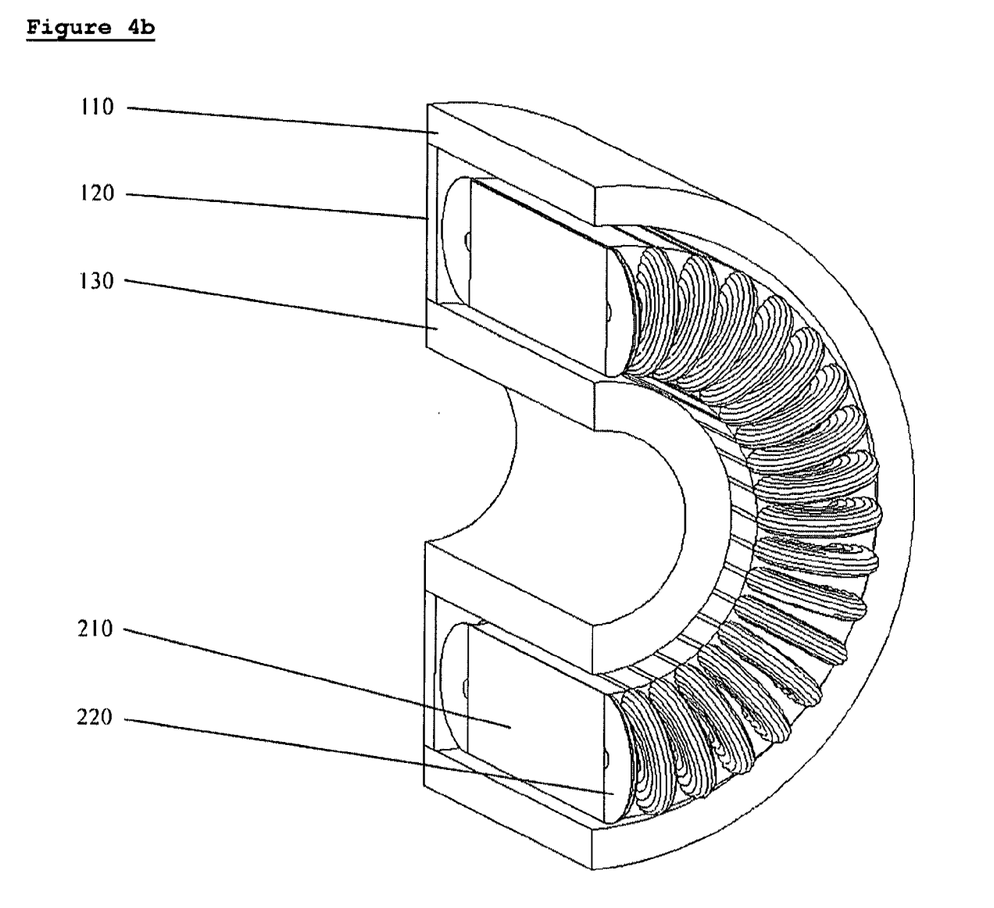

FIG. 4b shows a cutaway view of the same stator rotor combination as FIG. 4a. External rotor 110 is connected to internal rotor 130 through join 120. Join 120 is non conductive, and serves only to unite the two rotors 110 and 130, enabling them to spin in synchrony, and together provide rotational energy to a load.

The dual-rotor configuration enables a higher percentage of each turn of the stator windings to be active, since two faces of each stator winding turn are involved in electromechanical conversion.

The stator and rotor are not limited to being one internal to the other. In one embodiment, the stator may be an axial flux type stator. The rotor may then be situated to one or both sides of the stator, instead of interior to the stator. The stator and rotor rings will therefore then have the same outer active diameter as each other.

The generator 'housing' is an enclosure that wraps around the 'end turns' of the stator, and wraps around the rotor, but which does not actually touch the rotor. The housing includes a labyrinth seal to prevent chunks of debris from getting wedged between rotor and stator.

The device can be used for a variety of purposes, and is superior to other approaches for the following reasons:

1) Superior reliability and redundancy is inherent in the Chorus approach, which uses high phases order drive to generate both higher torques and overload capabilities as well as very high redundancy; failures in any given phase would only moderately reduce the power and efficiency for the generator as a whole.

2) This design is an induction machine, meaning no permanent excitation (magnetic field). This means that one can shut the system down in a fault condition. This cannot be achieved with a short-circuit in a permanent magnet machine.

3) The winding design of the present invention will permit much larger pole area without excessive end turn copper. The result is a smaller generator and package.

4) The toroidal winding enables a relatively large pole area. This design permits a very wide 'airgap', something which would be difficult with an ordinary induction machine design (in an ordinary winding design, the end turns increase in size as the pole area increases in size). The wide 'airgap' is necessary to permit easy construction and to reduce damage from flue-borne particulates. This design has a 5 mm air gap; an airgap of between 4-10 mm is practicable, although the upper limits would require a heavier machine.

The invention claimed is:

1. A system for using mechanical work done by flue gases with high temperatures and high particulate matter to generate electricity, said system comprising:
   a. a ring induction generator including a first ring comprising a stator with a plurality of alternating slots and teeth integrally formed only along an inner peripheral surface of said first ring, a second ring comprising a rotor positioned concentrically within said first ring separated from said inner peripheral surface by a gap sized to provide space within said gap for a protective material on said first and second rings and to reduce damage from particulate matter, and a plurality of toroidally wound coils provided in each of said plurality of slots, said coils being wound to form an outside wound stator;
   b. a turbine rotatably mounted on a central shaft positioned concentrically within said second ring, wherein said turbine includes turbine blades with tips extending radially outwardly from said central shaft to fixedly connect with an inner surface of said second ring, whereby rotation of said turbine produced by flue gases causes said second ring to rotate with said turbine, directly driving the rotor; and
   c. support means comprising a plurality of radially spaced struts connected directly between a hub concentrically mounted with said central shaft and an outer circumference of said first ring.

2. The system of claim 1 wherein each of said rotor and said stator is individually potted in said protective material.

3. The system of claim 2 wherein said protective material is a multi-layer epoxy material.

4. The system of claim 1 wherein said stator slots are substantially wider than said teeth.

5. The system of claim 1 wherein a said gap between said stator and said rotor is in the range of 4-10 mm.

6. The system of claim 1 wherein each of said plurality of toroidally wound stator coils is independently driven.

7. The system of claim 1 wherein each of said plurality of stator coils is wound with flat rectangular wire.

8. The system of claim 1 wherein said stator has a substantially shorter length than diameter.

9. The system of claim 1 wherein said stator comprises more than three different phases per pole.

10. The system of claim 9 further comprising electronic means for providing current of a variety of harmonic orders lower than the phase count.

11. The system of claim 10 wherein said stator is wound to provide two of said different harmonics to be each associated with substantially a different machine impedance from one another.

12. The system of claim 1 wherein said support means further comprises active bearings.

13. The system of claim 1, wherein said first ring is formed from M19 steel and second ring is formed from copper.

14. The system of claim 1, further including sensor means for determining that the temperature of said flue gases leaving the chimney is hot enough to move to a safe level in the atmosphere.

15. The system of claim 1, further including a third ring comprising a rotor positioned concentrically outwardly of an outer peripheral surface of said first ring, wherein said third ring includes joining means connecting said third ring to said second ring and said first ring further includes a plurality of alternating slots and teeth formed along said outer peripheral surface.

* * * * *